Patented June 22, 1948

2,443,915

UNITED STATES PATENT OFFICE 2,443,915

COPOLYMER OF STYRENE WITH AN ESTER OF AN UNSATURATED DICARBOXYLIC ACID AND AN HYDROXY ACID ESTERIFIED WITH AN UNSATURATED ALCOHOL

John Leslie Jones, Toledo, Ohio, assignor, by mesne assignments, to Libbey-Owens-Ford Glass Company, a corporation of Ohio No Drawing. Application February 27, 1943, Serial No. 477,451

3 Claims. (Cl. 260—78.5)

The invention relates to compositions of a novel type that can be polymerized to produce useful new infusible resins.

Allyl esters of dibasic acids or monobasic unsaturated acids are known to polymerize to infusible resins. However, it is difficult to produce cast articles by the polymerization of such allyl esters because when cast and polymerized they tend to produce soft gels that harden very slowly. Moreover, such allyl esters tend to discolor during polymerization and such discoloration severely limits the possibilities of commercialization. Another important disadvantage of such allyl esters is their relatively high volatility. It is necessary to heat them to an elevated temperature in order to cause polymerization and their volatility is such that great difficulty is caused by vaporization of the esters during the polymerization process. Such vaporization causes gas bubbles and blisters. These esters are generally so volatile that when they are used in coating compositions they tend to evaporate before polymerization can take place. In all operations in which the esters are used their high volatility makes it difficult to avoid serious losses by evaporation.

An object of the invention is to provide novel compositions that are highly useful for polymerization into infusible resins. More specific objects and advantages are apparent from the description, which discloses and illustrates the invention and is not intended to impose limitations upon the claims.

Each of the novel compositions of the present invention contains a carbon compound that may be considered to be a derivative of an ester of a beta-gamma-olefinic alcohol with a monobasic hydroxy-substituted acid. The invention is based upon the discovery that certain compositions containing a polymerizable derivative of such an ester of a monobasic hydroxy-substituted acid have novel properties that make them extremely advantageous as starting materials for polymerization into an infusible resin.

In each of the novel polymerizable compositions to which the present invention relates, there is a compound in which a beta-gamma-olefinic alcohol radical is connected by an ester linkage to the acid radical of a hydroxy-substituted monobasic acid that in turn has its hydroxy group esterified to form a connection with the remainder of the molecule.

This method of molecular construction can be used to produce a type of molecule that not only can be polymerized to an infusible resin, but also has a boiling point high enough so that no volatilization occurs during the operations that it is necessary to use in the fabrication of a synthetic resin. This method of molecular construction is extremely versatile in that molecules of widely different types may be produced, which may be polymerized to infusible resins which have various properties and which range from rubbery solids to hard glassy transparent solids that are insoluble, infusible and very resistant to chemical attack. From the great variety of synthetic resins that can thus be produced, it is possible to select resins having properties that fit them for many different uses. For example, in accordance with the invention it is posisble to prepare compositions which can be polymerized with great rapidity, and from which colorless, transparent, infusible castings can be produced without difficulty. Thus the present invention obviates the disadvantages of the synthetic resins that have been produced heretofore by the polymerization of allyl esters of dibasic acids or monobasic unsaturated acids. The versatility of this method of molecular construction makes it possible to prepare polymerizable compounds which are compatible with various substances with which it may be desired to blend them, and which are capable of copolymerizing with various monomers that are now available commercially. In the practice of the invention, the compound may have a high molecular weight so that the product produced by its polymerization has a very high molecular weight and is therefore inert and resistant to deterioration.

Some of the most useful products embodying the invention are quite inexpensive to produce.

A further advantage of the compositions of the present invention is that in general they are stable at room temperature without the addition of a polymerization inhibitor.

A composition embodying the present invention contains an ester of two molecules, each of which is an alcohol listed in Table 1 below, with a substance having two carboxy groups. The substance having two carboxy groups is an ester of (a) one or two molecules each of which is a lactic or glycolic acid molecule with (b) one molecule of fumaric or maleic acid.

The first step in the preparation of a monomeric compound that may be used in a composition embodying the invention may consist in preparing an ester of a beta-gamma-olefinic alcohol with a monobasic hydroxy substituted, chloro substituted or bromo substituted acid. Such an ester is easily prepared by the methods customarily used for preparing other esters. An excess of the alcohol may be reacted with the acid in the presence of an acid catalyst to produce an ester, the water produced by the reaction and the excess of the alcohol being removed. The ester often can be separated from the excess of the alcohol by fractional distillation. In some cases it may be desirable to use an ester-interchange reaction. For example, since methallyl alcohol is unstable under acid conditions, it is desirable first to prepare a simple ester such as the methyl ester of the acid to be used, and then to prepare the desired methallyl ester by reacting the methyl ester with methallyl alcohol, in the presence of a small amount of sodium as a catalyst, while distilling off the liberated methyl alcohol.

In this first step there may be prepared an ester of any of the following alcohols

Table 1

$CH_2=CH-CH_2-OH$
Allyl alcohol $CH_3-CH=CH-CH_2-OH$
Crotyl alcohol $$CH_2=CH-\underset{\underset{CH_3}{|}}{CH}-OH$$
Alpha-methyl allyl alcohol $$CH_2=\underset{\underset{CH_3}{|}}{C}-CH_2-OH$$
Methallyl alcohol with an acid such as the following:

Table 2

$$\underset{\underset{Cl}{|}}{CH_2}-\overset{\overset{O}{\|}}{C}-OH$$
Chloracetic acid $$\underset{\underset{OH}{|}}{CH_2}-\overset{\overset{O}{\|}}{C}-OH$$
Glycolic acid $$CH_3-\underset{\underset{Br}{|}}{CH}-\overset{\overset{O}{\|}}{C}-OH$$
Alpha-bromo propionic acid $$CH_3-\underset{\underset{OH}{|}}{CH}-\overset{\overset{O}{\|}}{C}-OH$$
Lactic acid After the preparation of such an ester, a compound that may be used in a composition embodying the invention may be prepared by reacting two molecules of the ester with one molecule of a derivative of acids fumaric or maleic acid.

If an ester of a hydroxy-substituted acid has been prepared, it may be reacted with the acid dichloride of the dibasic acid (with elimination of hydrogen chloride), or with the anhydride, if one exists, or in some cases with the dibasic acid itself (with elimination of water).

If an ester of a chloro- or bromo-substituted acid has been prepared, it may be reacted with the potassium or sodium salt of the dibasic acid, the chloride or bromide of potassium or sodium being formed as a by-product of the reaction. Each of these reactions produces an acyl dis-derivative of the ester, in which the acyl group is the divalent acid radical of the dibasic acid.

In general the reaction takes place very readily when the dichloride of fumaric acid and the ester are simply brought together on a water bath or even at room temperature. In the case of maleic acid, the acid dichloride does not exist so that it is necessary to use maleic anhydride or maleic acid itself.

When an ester of a bromo-substituted or chloro-substituted acid has been prepared in the first step, it may be reacted as explained above with the potassium or sodium salt of maleic or fumaric acid. It may be desirable to carry out such reactions in an atmosphere of an inert gas such as carbon dioxide or nitrogen in some cases to prevent the development of a slight yellow color and to produce colorless products. The yields of compounds by these reactions are usually quantitative except for slight manipulation losses.

It should be noted that a mixture of two different esters may be used for the reaction with the dibasic acid derivative if desired. Moreover, one molecule of an ester of a hydroxy-, chloro- or bromo-substituted acid may be reacted with one molecule of the dibasic acid derivative to prepare a product that is a half ester of the dibasic acid derivative. One molecule of such half ester may then be reacted with one molecule of a different ester of a hydroxy-, chloro- or bromo-substituted monobasic acid to produce a compound that is unsymmetrical in that it contains residues of two different hydroxy-substituted monobasic acid esters.

One molecule of an ester of one of the alcohols listed in Table 1 with any of the monobasic hydroxy-substituted, chloro-substituted or bromo-substituted acids referred to in the above discussion may also be reacted with one molecule of a half ester of maleic or fumaric acid with one of the alcohols listed in Table 1, or of a salt or the monochloride of such a half ester.

If an ester of a hydroxy-substituted acid has been prepared, one molecule thereof may be reacted with one molecule of the acid chloride of such a dibasic acid half ester (with elimination of hydrogen chloride) or in some cases with one molecule of the half ester itself (with elimination of water).

If an ester of a chloro- or bromo-substituted acid has been prepared, one molecule thereof may be reacted with one molecule of the monopotassium or monosodium salt of the dibasic acid half ester, the chloride or bromide of potassium or sodium being formed as a by-product of the reaction.

It will be evident that the reactions described in the last three paragraphs are analogous to the reactions previously described. The compounds formed by the reactions described in the last three paragraphs are the same as the compounds formed by the reactions previously described except that they contain only one instead of two residues of a hydroxy-substituted acid. Like the compounds formed by the reactions previously described, the compounds formed by the reactions described in the last three paragraphs contain residues of two alcohol molecules, which alcohol molecules may be identical or different, but which in any case are selected from the alcohols listed in Table 1.

Polymerization

A polymerized product embodying the invention, having any desired properties, may be produced by polymerizing a selected combination of monomeric or partially polymerized compounds of the present invention, or a mixture of such compounds with one or more additional compounds or with any other desired material or combination of materials.

One compound that may be polymerized in combination with other compounds to produce a resin is an ester of two unsubstituted beta-gamma-olefinic alcohol molecules, each containing from three to four carbon atoms, with an ester of not more than two saturated alpha-hydroxy monocarboxylic acid molecules each having from two to three carbon atoms and a molecule of maleic or fumaric acid i. e. an ester of two alcohol molecules (each of which is a molecule of allyl, methallyl, alpha-methyl allyl or crotyl alcohol) with another molecule which is an ester of one or two molecules of lactic or glycolic acid with a molecule of maleic or fumaric acid.

Polymerization of the present compositions may be carried out in the presence of a suitable catalyst. Peroxide catalysts such as benzoyl peroxide, hydrogen peroxide, succinyl peroxide, acetyl peroxide, peracetic acid and perbenzoic acid are preferred. The amount of catalyst to be used is simply that amount which causes the polymerization to take place at the desired rate. Polymerization may be carried out in the presence of a catalyst at ordinary temperatures, but it is usually more convenient to employ an elevated temperature to expedite the polymerization. The temperature may be any temperature below the decomposition point of the compounds being polymerized. Usually the polymerization may be carried out rapidly enough for all practical purposes at temperatures well below the decomposition point.

In carrying out the polymerization it is often desirable to exclude air, as by employing an atmosphere of an inert gas, in order to prevent the development of a yellow color or in order to obviate the retarding effect which air sometimes has upon the polymerization. When the polymerization is carried out at a temperature of about 70° C. to about 80° C. there is usually less danger of coloring than when the polymerization is carried out at a higher temperature, such as 100° C.

A compound that is an ester of two alcohol molecules (each of which is a molecule of allyl, methallyl, alpha-methyl allyl or crotyl alcohol) with another molecule which is an ester of one or two molecules of lactic or glycolic acid with a molecule of maleic or fumaric acid is particularly useful for copolymerization with styrene. In such copolymerization the proportions may be varied widely from a very small proportion of such compound to a very small proportion of styrene.

In the copolymerization of any of these combinations of monomers as little as 25 per cent of such compound may cause a hard, infusible copolymer to be produced. Even when the proportion of such compound is very small, the copolymer is superior to the product that would be produced by omission of such compound in that the copolymer has a higher softening point and better resistance to organic solvents and other chemicals.

Many of the compounds used in accordance with the present invention are unique because of their low volatility, which makes them very useful in casting compositions. Such compositions in monomeric or partially polymerized liquid form, after the addition of a catalyst, may be poured into open molds and heated to produce infusible castings. In some cases the monomeric or partially polymerized compounds, in admixture with a filler if desired, may be shaped by ordinary compression molding or transfer molding procedures and polymerized in a hot mold to produce molded articles. In the production of molded or cast articles, plasticizers, lubricants, fillers, pigments and other coloring matter may be incorporated if desired. Many of the present compositions are useful in the formulation of coating compositions.

An important application of some of these compounds, particularly the preferred compounds mentioned, consists in intimately mixing or dissolving such a compound, in monomeric or partially polymerized form, in a thermoplastic material with which the compound is compatible and then polymerizing. In such cases the compound serves as a polymerizable plasticizer. This application is possible because of the wide variety of the compounds that can be prepared, and because of the fact that many of the compounds have the properties of plasticizers. In such a composition the proportion of the compound to the thermoplastic material may be varied widely, from a very small proportion of the compound to a very small proportion of the thermoplastic material. The use of only a small proportion of a thermoplastic material often imparts desirable properties. A composition of this type containing only a small proportion of the compound has a higher softening point, greater solvent resistance and lower flexibility than a thermoplastic material. Such compositions are useful for injection molding, transfer molding and cementing metal surfaces. The thermoplastic material used may consist of cellulose acetate, polymerized vinyl acetate, polymerized styrene, polyvinyl chloride, polyvinyl butyral, rubber, shellac or any other thermoplastic material with which the polymerizable compound is compatible.

The present compositions may be partially polymerized to form gels which may be extruded as filaments. Then by the completion of polymerization, such filaments may be converted into chemically resistant threads having high softening points.

The monomeric or partially polymerized compositions having high boiling points may be used for treatment of textiles followed by polymerization, to produce luster, weighting and other effects without any deleterious effect on the strength of the textile fibers. Compositions containing monomeric or partially polymerized compounds of the present invention may be used as adhesives and as impregnating or laminating compositions for textiles, glass fiber cloth, paper, paper pulp and other materials.

*Example 1*

After the addition of 7.5 grams of sulfuric acid to 1500 grams of a 50 per cent aqueous solution of lactic acid, distillation is carried out first at atmospheric pressure and then under vacuum until no further water can be removed. To the residue of about 570 grams, consisting essentially of polylactic acid, is added 2400 grams of allyl alcohol. After 12 hours of refluxing the excess of allyl alcohol is distilled off at atmospheric pressure and refractionated in a packed column to recover the allyl lactate carried over in the alcohol vapor. The crude ester is distilled and then redistilled to produce a 70 per cent yield of allyl lactate. This yield can be increased by recovering and reusing the unreacted polylactic acid remaining in the esterification vessel. A mixture of 65 grams (one-half mol) of allyl lactate, 24.5 grams (one-fourth mol) of maleic anhydride, 1 gram of p-toluene sulfonic acid and 100 cc. of toluene is refluxed for 12 hours with a Dean-Stark moisture trap connected to the condenser for collection of the water phase. After 12 hours the water phase consists of 4 cc. The resulting toluene solution is washed three times with water and dried over calcium sulfate and the toluene is then distilled off under reduced pressure. The product is a 94 per cent yield of a pale straw-colored liquid consisting of maleyl bis-(allyl lactate)

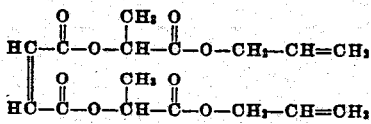

A lighter colored product can be obtained by the use of a carbon dioxide atmosphere during refluxing, and by the use of hydrogen chloride gas instead of p-toluene sulfonic acid as the catalyst. However, any reasonably strong acid serves as a catalyst, and the solvent may be any one that dissolves the reactants and yet remains immiscible with the water layer. The use of a solvent having a lower boiling point would cause the reaction to take longer. Upon heating at about 80° C. in the presence of about 1 per cent of its weight of benzoyl peroxide, maleyl bis-(allyl lactate) polymerizes to a hard, transparent, infusible, insoluble resin. The value of $N_D^{25}$ is 1.463 and of $d_4^{25}$ is 1.130 for the monomer.

*Example 2*

A mixture of 2 mols of fumaric acid and 5 mols of thionyl chloride is refluxed for 40 hours and the excess of thionyl chloride is removed by distillation of the product through a small packed column to give an 89 per cent yield of fumaryl dichloride having a boiling point of 159–160° C. at atmospheric pressure. To 260 grams (2 mols) of allyl lactate is added 153 grams (1 mol) of fumaryl dichloride, one drop at a time over a period of 2 hours in an atmosphere of carbon dioxide and at a temperature of 85° to 95° C. After 4 hours at this temperature the product has a constant weight of about 340 grams and consists of a quantitative yield of a pale straw-colored liquid consisting of fumaryl bis-(allyl lactate)

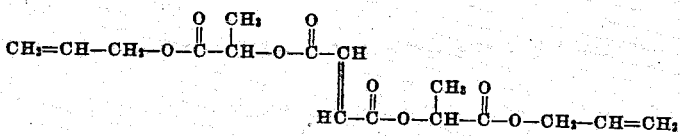

A pale straw color is characteristic of products obtained from colored acid chlorides such as fumaryl dichloride. The product is washed with water twice and then once with a dilute aqueous sodium hydroxide solution and then twice more with water, and is finally dried over anhydrous calcium sulfate. The product has a refractive index measured at 25° C. by means of the Sodium D line ($N_D^{25}$) of 1.468, and a specific gravity at 25° C. compared with water at 4° C. ($d_4^{25}$) of 1.138. A sample of this compound containing about 1 per cent of its weight of benzoyl peroxide polymerizes in about 5 minutes at 105° C. to a hard, transparent, infusible, insoluble resin. A composition consisting of about 50 per cent by weight of fumaryl bis-(allyl lactate), about 50 per cent of styrene and about 0.2 per cent of benzoyl peroxide, at 105° C. forms a gel in less than one-half hour, and a hard, infusible, colorless, transparent resin in 16 hours.

*Example 3*

A mixture of 46.4 grams of allyl glycolate and 30.6 grams of fumaryl dichloride is heated on a water bath at 85–95° C. for 2½ hours in a carbon dioxide atmosphere. The resulting oil crystallizes upon standing over-night. By recrystallization from ethanol a substantially quantitative yield of fumaryl bis-(allyl glycolate) melting at 71–72° C. can be obtained. If a sample consisting of 1000 parts of fumaryl bis-(allyl glycolate) and 2 parts of benzoyl peroxide is heated at 75° C. it gels in 1½ hours. If this sample is modified by replacing half of the fumaryl bis-(allyl glycolate) with styrene, it gels under the same conditions in ½ hour. A third sample which is the same as the second sample, except that the styrene is replaced by an equal weight of methyl methacrylate, gels under the same conditions in ¾ hour. All 3 samples are hard solids in 20 hours. After a total period of 40 hours at 75° C. the samples are hard, transparent and colorless. The second sample consisting of a copolymer of styrene and fumaryl bis-(allyl glycolate) has exceptional toughness.

Various embodiments of the invention may be devised to meet various requirements.

Having described my invention, I claim:

1. The product of the polymerization of a composition comprising (A) one part by weight of styrene, (B) one part by weight of an ester of (1) two unsubstituted beta-gamma-olefinic alcohol molecules, each containing from three to four carbon atoms, with (2) an ester of (a) not more than two saturated alpha-hydroxy monocarboxylic acid molecules each having from two to three carbon atoms and (b) a molecule of a dibasic acid of the class consisting of fumaric acid and maleic acid, and (C) a peroxide polymerization catalyst.

2. The product of the polymerization of a composition comprising a peroxide polymerization catalyst, one part by weight of styrene, and one part by weight of fumaryl bis-(allyl glycolate).

3. The product of the polymerization of a composition comprising a peroxide polymerization catalyst, one part by weight of styrene, and one part by weight of fumaryl bis-(allyl lactate).

JOHN LESLIE JONES.

REFERENCES CITED

The following references are of record in the file of this patent:

UNITED STATES PATENTS

| Number | Name | Date |
| --- | --- | --- |
| 1,877,304 | Grether | Sept. 13, 1932 |
| 2,260,295 | Carruthers et al. | Oct. 28, 1941 |
| 2,320,536 | Pollack et al. | June 1, 1943 |
| 2,370,566 | Muskat et al. | Feb. 27, 1945 |
| 2,370,572 | Muskat et al. | Feb. 27, 1945 |
| 2,370,573 | Muskat et al. | Feb. 27, 1945 |
| 2,370,574 | Muskat et al. | Feb. 27, 1945 |
| 2,379,251 | Muskat et al. | June 26, 1945 |

OTHER REFERENCES

Price, Mechanism of Reactions at Carbon-Carbon Double Bonds Interscience, 1946, page 95.

Certificate of Correction

June 22, 1948.

Patent No. 2,443,915.

JOHN LESLIE JONES

It is hereby certified that error appears in the printed specification of the above numbered patent requiring correction as follows: Column 3, line 61, for "dis-de-" read *bis-de-*; and that the said Letters Patent should be read with this correction therein that the same may conform to the record of the case in the Patent Office.

Signed and sealed this 31st day of August, A. D. 1948.

[SEAL]

THOMAS F. MURPHY,
*Assistant Commissioner of Patents.*